(12) United States Patent
Fourney

(10) Patent No.: US 8,915,353 B2
(45) Date of Patent: Dec. 23, 2014

(54) BELT CONVEYOR SYSTEM, ROLLER-ENGAGEMENT MECHANISM, AND RELATED METHOD

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 101 days.

(21) Appl. No.: 13/612,286

(22) Filed: Sep. 12, 2012

(65) Prior Publication Data

US 2014/0069776 A1 Mar. 13, 2014

(51) Int. Cl.
*B65G 17/24* (2006.01)

(52) U.S. Cl.
USPC .......................................... 198/779; 198/617

(58) Field of Classification Search
CPC ....................................................... B65G 17/24
USPC ......................................................... 198/779
See application file for complete search history.

(56) References Cited

U.S. PATENT DOCUMENTS

| | | | |
|---|---|---|---|
| 3,828,917 | A | 8/1974 | Oestergren |
| 4,262,794 | A | 4/1981 | Bourgeois |
| 4,264,002 | A | 4/1981 | Van Der Schie |
| 5,240,102 | A | 8/1993 | Lucas |
| 5,551,543 | A | 9/1996 | Mattingly et al. |
| 6,073,747 | A | 6/2000 | Takino et al. |
| 6,343,685 | B1 * | 2/2002 | Hofer ........................ 198/370.09 |
| 6,571,937 | B1 * | 6/2003 | Costanzo et al. ............. 198/779 |
| 6,644,459 | B2 | 11/2003 | Van Leeuwen et al. |
| 6,968,941 | B2 * | 11/2005 | Fourney ........................ 198/779 |
| 7,040,480 | B2 * | 5/2006 | Sedlacek .................. 198/457.02 |
| 7,249,669 | B2 | 7/2007 | Fourney |
| 7,344,018 | B2 * | 3/2008 | Costanzo et al. ............. 198/779 |
| 7,360,641 | B1 | 4/2008 | Fourney |
| 7,533,766 | B1 * | 5/2009 | Fourney ................... 198/370.09 |
| 7,581,632 | B2 | 9/2009 | Wallace et al. |
| 7,588,137 | B2 * | 9/2009 | Fourney ........................ 198/779 |
| 7,878,319 | B2 * | 2/2011 | Costanzo et al. ........ 198/457.02 |
| 7,971,701 | B2 * | 7/2011 | Fourney ................... 198/370.09 |
| 8,424,675 | B2 * | 4/2013 | Rau ................................. 198/779 |
| 8,544,634 | B2 * | 10/2013 | Fourney ........................ 198/779 |
| 8,684,169 | B2 | 4/2014 | Itoh et al. |
| 2008/0169171 | A1 | 7/2008 | Itoh et al. |
| 2009/0200139 | A1 | 8/2009 | Kissee et al. |
| 2012/0048678 | A1 | 3/2012 | Itoh et al. |
| 2012/0285799 | A1 | 11/2012 | Fourney |

OTHER PUBLICATIONS

International Search Report and Written Opinion of the International Searching Authority, PCT/US2013/058200, mailed Dec. 9, 2013, Korean Intellectual Property Office, Republic of Korea.

* cited by examiner

*Primary Examiner* — Ramya Burgess
*Assistant Examiner* — Thomas Randazzo
(74) *Attorney, Agent, or Firm* — James T. Cronvich

(57) ABSTRACT

A conveyor system having a roller-engagement mechanism and a method for conveying articles. The conveyor system includes an infeed conveyor feeding articles to a conveyor belt advancing in a direction of belt travel. The conveyor belt comprises obliquely rotatable rollers—single rollers or stacked sets of rollers—selectively activated by the roller-engagement mechanism. The roller-engagement mechanism has a rack supporting a plurality of flat belts. The flat belts advance in the direction of travel of the conveyor belt. The rack is movable between a first position in which the flat belts advancing with the conveyor belt contact the belt rollers to inhibit their rotation and carry articles atop the belt in the direction of belt travel and a second position in which the flat belts are out of contact with the belt rollers. In the second position, the roller-engagement mechanism can allow the belt rollers to rotate freely or can include a parallel set of elongated rollers between the flat belts put into rolling contact with the belt rollers to rotate them as the conveyor belt advances in the direction of belt travel.

27 Claims, 5 Drawing Sheets

BELT CONVEYOR SYSTEM, ROLLER-ENGAGEMENT MECHANISM, AND RELATED METHOD

BACKGROUND

The invention relates generally to power-driven conveyors and more particularly to a conveyor using a belt with rollers selectively disabled to sort conveyed articles.

Some conveying applications require that selected articles being conveyed along a main conveying path be diverted off the main path and conveyed away in another direction transverse to the main path.

SUMMARY

One version of a conveyor system embodying features of the invention comprises a first conveyor having a conveyor belt with belt rollers selectively inhibited from rotating by a roller-engagement mechanism. The conveyor belt is arranged to advance forward along a conveying path at a belt speed in a first direction. The belt has a first side and a second side defining its width. The belt rollers are rotatable on axes of rotation oblique to the first direction and arranged in columns extending longitudinally in the first direction and spaced apart laterally across the width of the conveyor belt a distance d. The roller-engagement mechanism underlies the conveyor belt along a portion of the conveying path to form a roller-engagement zone. The roller-engagement mechanism includes parallel first belt support surfaces that extending longitudinally and are spaced apart laterally the same distance d as the columns of stacked roller sets. The first belt support surfaces advance in the first direction at the belt speed. An actuator is coupled to the first belt support surfaces to move the first belt surfaces between a first position in which the first belt support surfaces contact the belt rollers and a second position in which the first belt support surfaces are out of contact with the belt rollers. In the first position, the first belt support surfaces advancing at the belt speed inhibit the rotation of the belt rollers passing through the roller-engagement zone.

In another aspect of the invention, a roller-engagement mechanism embodying features of the invention comprises first belt support surfaces and an actuator. The parallel first belt support surfaces extend longitudinally and are spaced apart laterally the same distance as the longitudinal columns of belt rollers in a conveyor belt having longitudinal columns and lateral rows of belt rollers, all of which rotate on axes oblique to the direction in which the conveyor belt is advancing. The first belt support surfaces advance in the first direction at the belt speed. The actuator is coupled to the first belt support surfaces to move the first belt surfaces between a first position in which the first belt support surfaces contact the belt rollers and a second position in which the first belt support surfaces are out of contact with the belt rollers. In the first position, the first belt support surfaces advancing at the belt speed inhibit the rotation of the belt rollers. In a third aspect of the invention, a method for translating articles in line with or perpendicular to an infeed flow of articles, comprises: (a) advancing a conveyor belt in a first direction at a belt speed, wherein the conveyor belt has a plurality of article-supporting belt rollers arranged to rotate on axes oblique to the first direction; (b) feeding articles onto the conveyor belt and atop the belt rollers in a second direction transverse to the first direction at an infeed position on a first side of the conveyor belt; (c) selectively inhibiting the rotation of the belt rollers to cause articles fed onto the conveyor belt to advance with the conveyor belt in the first direction and enabling the belt rollers to rotate to rotatively receive articles fed onto the conveyor belt at the infeed position.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1:
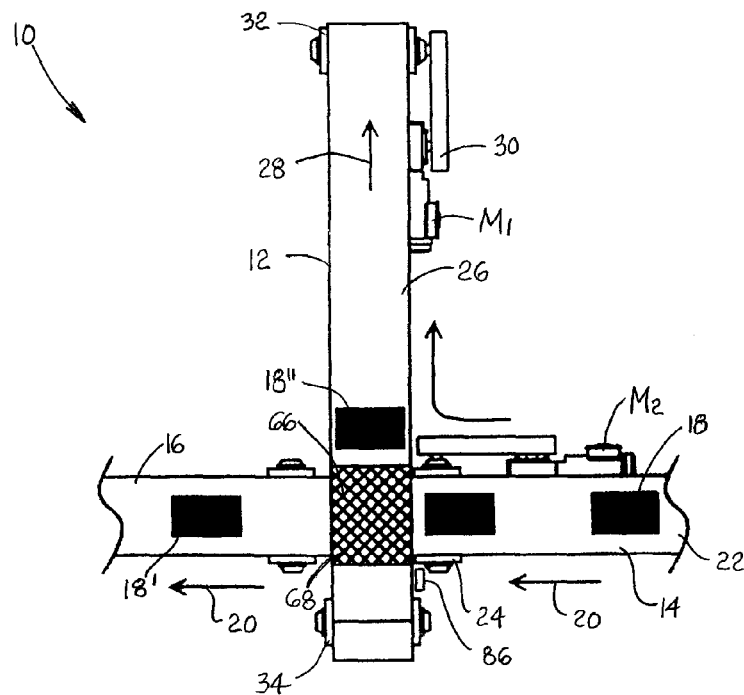
FIG. 1 is a top plan view of a conveyor system embodying features of the invention.

A conveyor system embodying features of the invention is shown in FIG. 1. The conveyor system includes a first conveyor 12 separating a main conveyor line into an infeed conveyor 14 and an outfeed conveyor 16. The infeed conveyor and the outfeed conveyor both convey articles 18 in the same direction, as indicated by arrows 20. The infeed conveyor may be a belt conveyor that includes a conveyor belt 22 driven in the main direction of product flow 20 by a motor $M_2$ and drive sprockets or pulleys 24, a powered roller conveyor, or another conveyance transporting articles in a single file. Likewise, the outfeed conveyor 16 may be a belt conveyor, a powered roller conveyor, a chute, or other conveyance device.

The first conveyor 12 is a belt conveyor having an endless conveyor belt 26 driven in a first direction at a belt speed by a motor $M_1$ and associated drive train 30 and drive sprockets, drums, or pulleys 32. The belt 26 is trained around the drive sprockets 32 and around idle sprockets at the upstream end of a conveying path.

Figure 2:
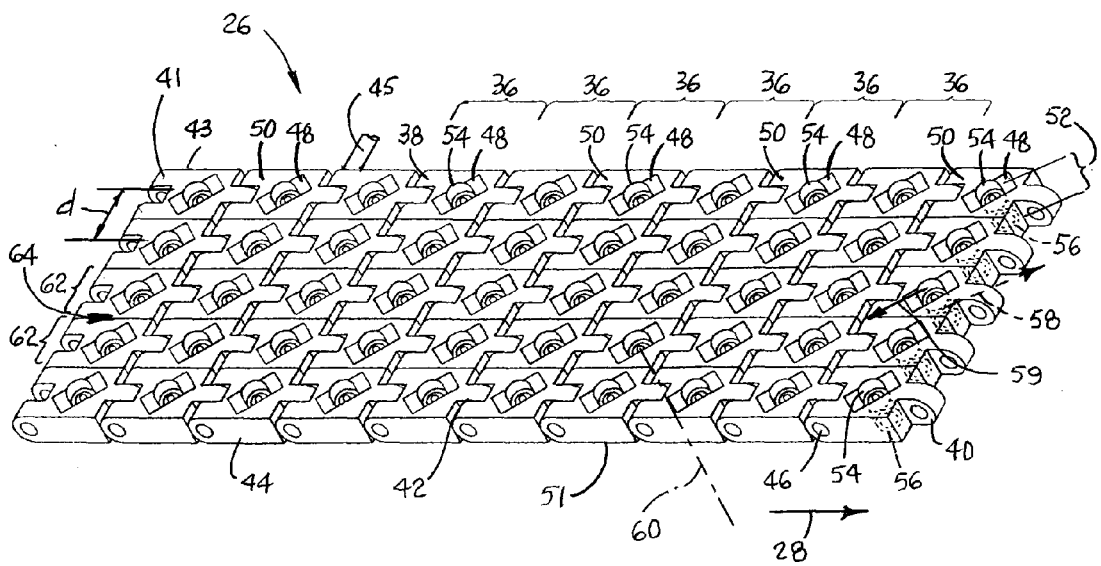
FIG. 2 is an oblique view of a dual angled-roller conveyor belt usable in a conveyor system as in FIG. 1.

One version of the conveyor belt 26 is shown in FIG. 2. In this version, the conveyor belt is a modular plastic conveyor belt constructed of rows 36 of one or more belt modules 38 arranged side by side and end to end. Each row has hinge elements 40, 41 at opposite ends that interleave with the hinge elements of an adjacent row to form a hinge joint 42 between belt rows. The belt extends laterally in width from a first side 43 to a second side 44. The rollers are hingedly connected together at hinge joints by hinge rods 45 through aligned lateral holes 46 in the hinge elements. Cavities 48 formed in each row of belt modules extend through the thickness of the conveyor belt 26 from an outer surface 50 to an opposite bottom surface 51. Mounted in each cavity 48 is a stacked roller set 52 that includes an article-supporting upper belt roller 54 stacked atop and rotatably coupled to a lower belt roller 56. In this example, the peripheries of the upper and lower belt rollers 54, 56 are in frictional contact. When the bottom belt roller 56 rotates in a first direction 58, the top roller rotates in an opposite direction 59. Both rollers 56, 58 rotate on axes 60 oblique to the longitudinal direction of the belt given by its direction of travel 28. As shown in FIG. 2, the stacked roller sets 52 are arranged in spaced apart longitudinal columns 62 and lateral rows 36 with longitudinal gaps 64 between consecutive columns on the outer and bottom surfaces 50, 51 of the belt 26. Consecutive columns 62 are spaced apart a distance d. Examples of such a conveyor belt are the INTRALOX® Series 400 DARB modular plastic conveyor belt manufactured and sold by Intralox, L.L.C. of Harahan, La., U.S.A. and those belts shown in U.S. Pat. No. 7,588,137, incorporated into this disclosure by reference.

Figure 3:
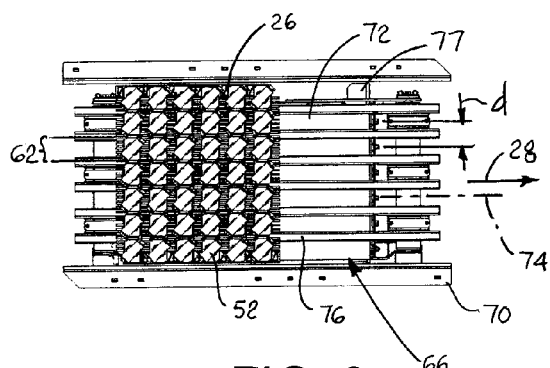
FIG. 3 is a top plan view of a roller-engagement zone of a conveyor system as in FIG. 1 with part of the conveyor belt removed.
Figure 4:
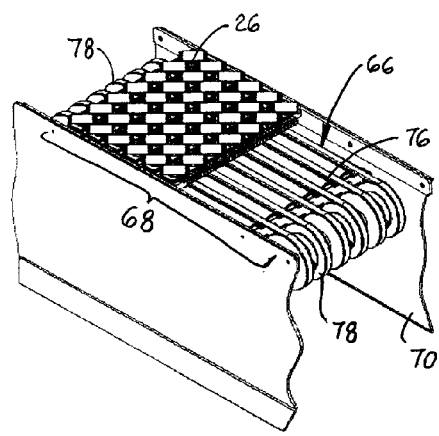
FIG. 4 is an isometric view of the roller-engagement zone of FIG. 3.

As shown in FIGS. 3 and 4, a roller-engagement mechanism 66 underlies the conveyor belt 26 along a portion of its conveying path. As shown in FIG. 1, the roller-engagement mechanism 66 underlies the conveyor belt 12 along the conveying path between the infeed conveyor 14 and the outfeed conveyor 16 to form a roller-engagement zone 68. The roller-engagement mechanism 66 is mounted in a conveyor frame 70, as shown in FIGS. 3 and 4. The mechanism includes, in this example, six parallel elongated rollers 72 that are rotatable on axes 74 parallel to the direction of belt travel 28. Consecutive rollers are spaced apart laterally by the same distance d as the longitudinal column 62 of stacked roller sets 52. Alternately positioned across the width of the roller-engagement zone 68 are endless narrow belts 76, such as V-belts or timing belts, trained around shaft-mounted pulleys 78 at opposite ends of the roller-engagement zone 68. The pulleys 78 are driven by a motor (not shown in FIGS. 3 and 4) in the same direction 28 as the conveyor belt 26 and at the same speed. Like the elongated roller 72, the belts 76 are spaced apart laterally the same distance d as the columns of stacked belt roller sets. The rollers 72, the belts 76, and the pulleys 78 are mounted in a rack 77. Unlike the belts 72, which advance in the same direction as the conveyor belt 26, the elongated rollers 72 are stationary, or fixed in their position, their only motion being rotation about their longitudinal axes 74.

Figure 5:
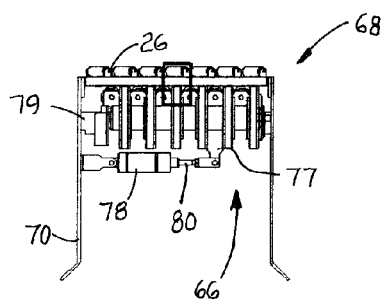
FIG. 5 is a front elevation view of the roller-engagement zone of FIG. 4 with a roller-engagement mechanism in a position inhibiting rotation of belt rollers.
Figure 6:
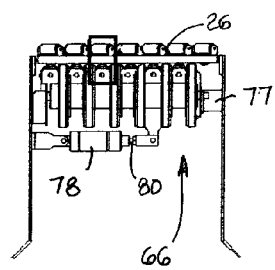
FIG. 6 is a front elevation view as in FIG. 5 with the roller-engagement mechanism in a shifted position allowing the belt rollers to rotate.
Figure 5A:
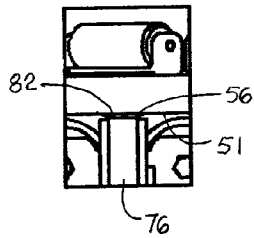
FIG. 5A is an enlarged view of a portion of FIG. 5.

As shown in FIGS. 5 and 6, the roller-engagement mechanism 66 includes an actuator 78, shown as a linear actuator in this example, attached at one end to the frame 70 and at the other end to a bracket 79 depending from the rack 77. The actuator 78 translates the rack 77 laterally between two positions underlying the conveyor belt 26. In a first position, shown in FIGS. 5 and 5A, the actuator's piston rod 80 is extended to position the belts 76 into alignment and contact with the lower rollers 56 of the stacked roller sets. The flat outer surfaces of the belts 76 form first belt support surfaces 82 supporting the belt in the roller-engagement zone 68 by contact with the lower belt rollers 56, which extend below the bottom side 51 of the belt. When the belt support surfaces 82 provided by the belt 76 advance in the same direction as the conveyor belt 12 and at the same speed, the stacked roller sets 52 are inhibited from rotation because the relative motion between the lower belt rollers 56 and the outer faces of the supporting belts is zero.

Figure 6A:
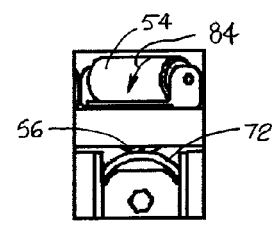
FIG. 6A is an enlarged view of a portion of FIG. 6.

In a second position of the rack, shown in FIGS. 6 and 6A, the piston rod 80 of the actuator 78 is retracted a distance d/2 from the other position to position the elongated roller 72 directly under the lower belt rollers 56 of the columns of stacked roller sets. In this case, the lower belt rollers 56 rotate on the freely rotatable elongated rollers 72 as the conveyor belt 26 advances. Because the lower belt rollers 56 trace a helical path around the peripheries of the elongated rollers 72, the elongated rollers are referred to as helix rollers. The belt in FIG. 6A is advancing into the page, the article-supporting upper belt roller 54 rotates in the direction given by arrow 84, which pushes an article atop the belt roller obliquely rearward relative to conveyor belt 26 advancing forward into the page. Because the rearward component of motion opposite to the direction of belt travel equals the forward advance of the conveyor belt 26, the articles translate directly across the roller-engagement zone 66 from the infeed conveyor 14 to the outfeed conveyor 16 without rotation or significant offset in the direction of belt travel 28, as indicated by the article 18' in FIG. 1. When the rack 77 is in the position shown in FIG. 5, in which the stack roller sets 52 are inhibited from rolling, the articles are translated in the direction of belt travel 28 by the conveyor belt 26 as indicated by the article 18" in FIG. 1. To prevent rotation of the article 18" in the roller-engagement zone 68, the actuator 78 positions the helix rollers 72 under the stacked roller sets 52 to draw the article from the infeed conveyor onto the conveyor belt 26 without rotation. Once the article is more or less centered across the width of the conveyor belt in the roller-engagement zone 68, the actuator positions the moving belt 76 under the stacked roller sets 52 to stop the lateral translation of the article and start its longitudinal translation on the conveyor belt 26.

Figure 7:
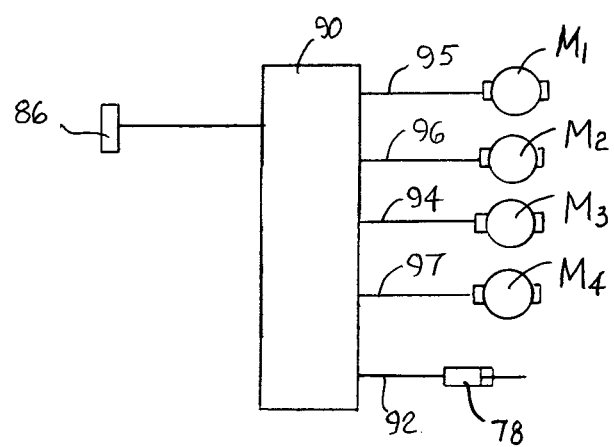
FIG. 7 is a block diagram of a control system usable with a conveyor system as in FIG. 1.

A sensor 86, shown disposed at the infeed position from the infeed conveyor 14 onto the roller-engagement zone 68 in FIG. 1, is used to determine when an article 18 is being fed onto the conveyor belt 26 from the infeed conveyor. The sensor may be an optical sensor, a proximity switch, or an imaging system, for example. The sensor 86 is coupled to the actuator 78 through a controller 90. The sensor transmits a signal over a signal line 88 to the controller 90, such as a programmable controller or other programmed computing device, as shown in FIG. 7. From the signal, the controller can determine that the leading end of an article is entering the roller-engagement zone 68 and that the trailing end of the article is entering the zone. When the article is first fed onto the conveyor belt 26 from the infeed conveyor 14, the controller sends a signal over an actuator control line 92 to the actuator 78 to move the rack 77 to the second position, in which the belt rollers are activated to rotate to help draw the article onto the conveyor belt 26. After the controller determines that the trailing end of the article has been fed onto the conveyor belt, it decides whether to pass the article across the conveyor belt to the outfeed conveyor 16 or to convey it along the conveyor belt 26. If the decision is to pass the article across the belt to the outfeed conveyor, the controller does not change the command signal and maintains the rack in the second position with the belt rollers rotating to translate the article in line with the infeed conveyor to the outfeed conveyor. The decision is to translate the article 90° from the direction of the singulated flow of articles along the infeed conveyor and to convey it along the conveyor belt 26, the controller sends a signal to the actuator to move the rack to the first position, in which the belt 72 advancing in the direction of travel of the conveyor belt contact the lower rollers of the stacked belt roller sets to inhibit their rotation and allow the article to be conveyed on the conveyor belt. Although the motor $M_3$ driving the roller-engagement belt 72 may be run at a set speed, its speed may alternatively be controlled by the controller 90 over a motor-control line 94. The controller also controls the speed of the conveyor belt's motor $M_1$ over a motor-control line 95, the speed of the infeed conveyor's motor $M_2$ over a motor-control line 96, and the speed of the outfeed conveyor's motor $M_4$ over a motor control line 97.

Figure 8:
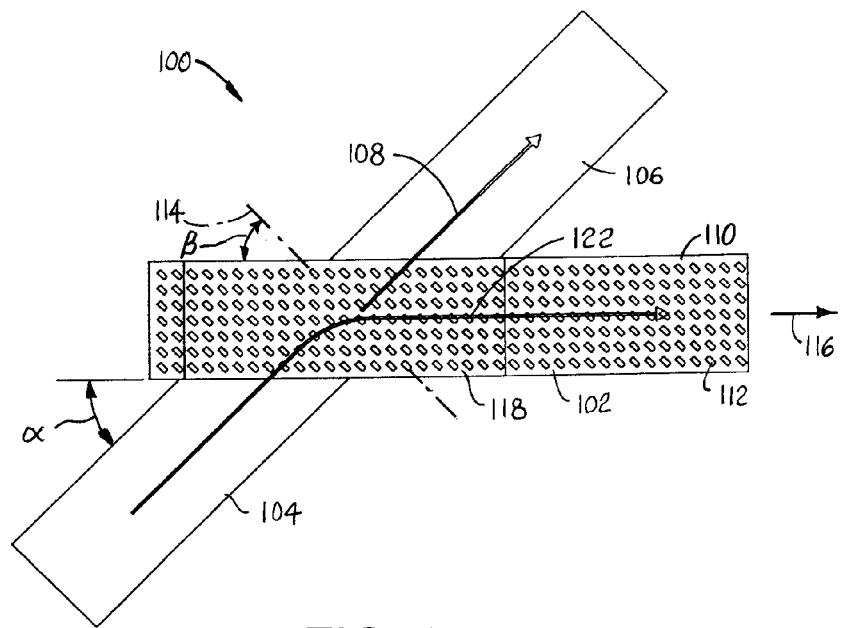
FIG. 8 is a top plan view of a second version of a conveyor system embodying features of the invention.
Figures 9, 10:
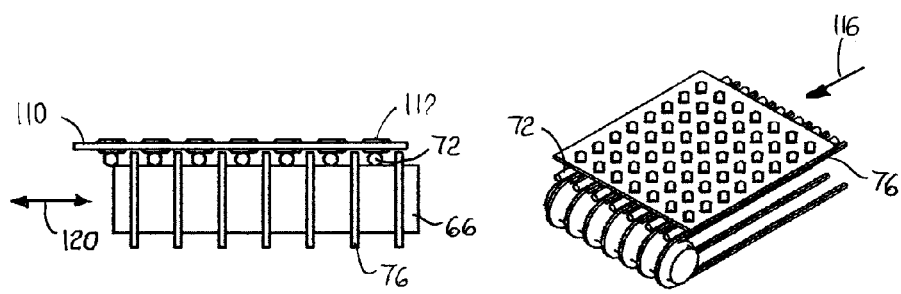
FIG. 9 is a front elevation view of a roller-engagement zone of the conveyor system of FIG. 8.
FIG. 10 is an isometric view of a portion of the roller-engagement mechanism in the conveyor system of FIG. 8.

Another version of a conveyor system embodying features of the invention is shown in FIGS. 8-10. The conveyor system 100 includes a first conveyor 102 separating a main conveyor line into an infeed conveyor 104 and an outfeed conveyor 106 on opposite sides of the first conveyor. The infeed conveyor and the outfeed conveyor both convey articles in the same direction 108. Like the infeed and outfeed conveyor in the conveyor system 10 of FIG. 1, the infeed and outfeed conveyors 104, 106 are transverse to the first conveyor, but at an oblique angle α, rather than at 90°.

The first conveyor 102 is a belt conveyor having an endless conveyor belt 110. The belt includes rows and columns of article-supporting belt rollers 112 that rotate on axes of rotation 114 oblique to the direction of belt travel 116 at an angle β. One example of such a roller belt is the INTRALOX® Series 400 Angled Roller belt or the roller belts described in U.S. Pat. No. 6,968,941, incorporated into this disclosure by reference. The belt rollers 112 extend through the thickness of the belt 110. Articles are supported on the belt atop the belt rollers 112. The roller-engagement mechanism 66 underlies the conveyor belt 110 in the roller-engagement zone 118 separating the infeed conveyor 104 from the outfeed conveyor 106. The roller-engagement mechanism 66 is shown in an actuating position in FIGS. 9 and 10. In the actuating position, the elongated rollers 72 are positioned in contact with the belt rollers 112 from below. As the conveyor belt 110 advances in the direction of belt travel 116, the belt rollers 112 ride in rolling contact along the elongated rollers 72, which causes the belt rollers to rotate with a longitudinal component of velocity in the direction of belt travel equal to the belt speed and a lateral component of velocity equal to the longitudinal component for β=45°. (The lateral component decreases as β increases.) But, because the belt is advancing in a direction of belt travel 116, the absolute speed of the articles in the roller-engagement zone 118 with the rollers actuated is twice the belt speed. For β=45°, the absolute lateral speed of the articles is half the net longitudinal speed. If the angle α of the infeed conveyor 104 is about the same as the angle β of the axes of the belt rollers, the activated belt rollers draw the article onto the roller belt 110 and send it across onto the outfeed conveyor 106 in the main conveying direction 108. If the roller-engagement mechanism 66 is side-shifted by its actuator into a breaking position, as indicated by arrow 120 in FIG. 9, so that the flat belt 76 advancing in the direction of belt travel 116 at the same speed as the conveyor belt, the belt rollers 112 are inhibited from rotating. When the belt rollers are braked after an article is first drawn onto the conveyor belt, the article follows a curved trajectory 122 through the roller-engagement zone 118 and is sorted from the main conveying direction 108.

Figure 11:
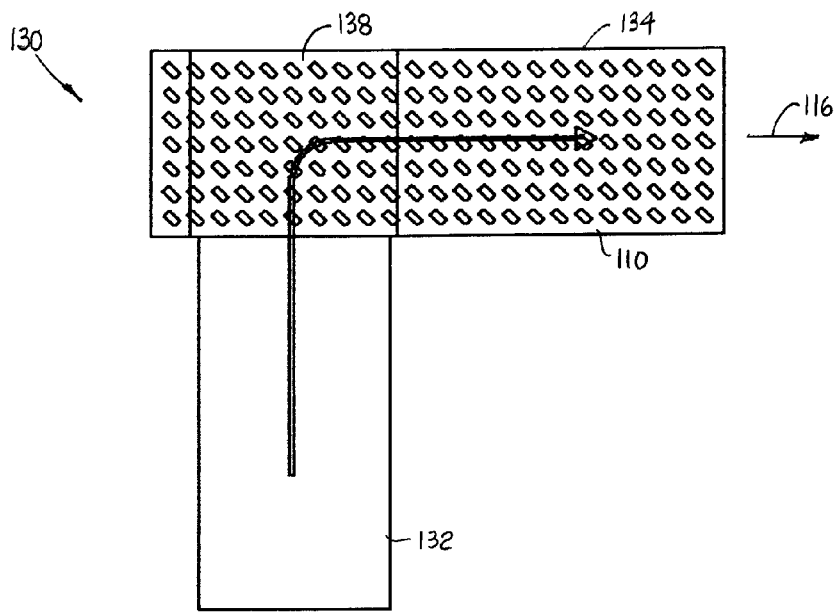
FIG. 11 is a top plan view of a third version of a conveyor system embodying features of the invention.
Figure 12:
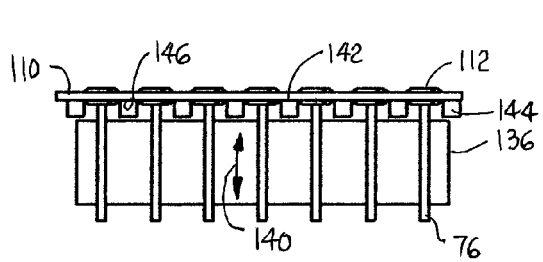
FIG. 12 is a front elevation view of a roller-engagement zone of the conveyor system of FIG. 11.
Figure 13:
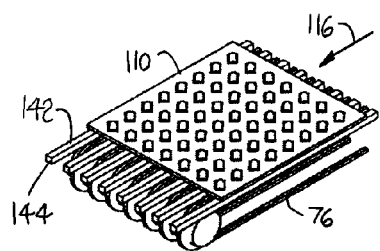
FIG. 13 is an isometric view of a portion of the roller-engagement mechanism in the conveyor system of FIG. 11.

Still another version of a conveyor system embodying features of the invention is shown in FIGS. 11-13. The conveyor system 130 has an infeed conveyor 132 feeding articles over one side of a belt conveyor 134 having an oblique-roller conveyor belt 110 as in FIG. 8 advancing in a direction of belt travel 116. A roller-engagement mechanism 136 underlies the conveyor belt in a roller-engagement zone 138 receiving articles from the infeed conveyor 132. The roller-engagement mechanism 136 differs from that shown in FIGS. 3 and 9 in that it does not include elongated rollers 72. The roller-engagement mechanism 136 includes an actuator that raises and lowers the flat belt 76, as indicated by arrow 140, into and out of contact with the belt rollers 112 protruding past the bottom of the conveyor belt 110. When the flat belts 76, which advance in the direction of belt travel 116 at the same speed as the conveyor belt 110, are raised into contact with the belt rollers 112, they brake the belt rollers. When the roller-engagement mechanism 136 is lowered, the flat belts are out of contact with the belt rollers 112. In this state, the conveyor belt 110 is supported on stationary belt surfaces 142 provided by parallel wear bars 144 contacting the bottom 146 of the conveyor belt between the columns of belt rollers. With the flat belts 76 lowered, the belt rollers are free to rotate. The roller-engagement mechanism 136 alternates between engagement and no engagement with no active roller rotation as in the other versions described previously.

As shown in FIG. 11, an article fed by the infeed conveyor 132 onto the oblique-roller conveyor belt 110 coasts laterally on the freely rotating belt rollers 112 because the flat belts 76 are lowered—out of contact with the belt rollers. When the roller-engagement mechanism raises the flat belts 76 into the braking position in contact with the belt rollers 112, the article is carried away in the direction of belt travel 116 with no more lateral motion of the article across the conveyor belt.

The invention claimed is:

1. A conveyor system comprising:
   a first conveyor including:
      a conveyor belt arranged to advance forward along a conveying path at a belt speed in a first direction and including:
         a first side and a second side defining the width of the conveyor belt; and
         a plurality of belt rollers rotatable on axes of rotation oblique to the first direction and arranged in columns extending longitudinally in the first direction and spaced apart laterally across the width of the conveyor belt a distance d;
      a roller-engagement mechanism underlying the conveyor belt along a portion of the conveying path to form a roller-engagement zone, wherein the roller-engagement mechanism includes:
         a plurality of parallel first belt support surfaces extending longitudinally and spaced apart laterally the same distance d as the columns of belt rollers, wherein the first belt support surfaces advance in the first direction at the belt speed;
         an actuator coupled to the first belt support surfaces to move the first belt support surfaces between a first position in which the first belt support surfaces are in contact with the belt rollers and a second position in which the first belt support surfaces are out of contact with the belt rollers;
      wherein, in the first position, the first belt support surfaces advance in the first direction at the belt speed to inhibit the rotation of the belt rollers passing through the roller-engagement zone.

2. A conveyor system as in claim 1 further comprising a plurality of parallel bars underlying the conveyor belt between the columns of belt rollers and wherein the actuator raises the first belt support surfaces relative to the bars in the first position into contact with the belt rollers and lowers the first belt support surfaces relative to the bars in the second position out of contact with the belt rollers to allow the belt rollers to rotate freely on their axes of rotation, the parallel bars supporting the conveyor belt.

3. A conveyor system as in claim 2 wherein the belt rollers extend through the thickness of the conveyor belt to contact the first support surfaces under the conveyor belt and to support articles carried on the conveyor belt.

4. A conveyor system as in claim 2 further comprising an infeed conveyor arranged to feed articles onto the conveyor belt at the first side in the roller-engagement zone.

5. A conveyor system as in claim 4 further comprising a sensor sensing that an article is being fed onto the conveyor belt from the infeed conveyor and coupled to the actuator to move the first belt support surfaces to the second position to allow the belt rollers to rotate freely to rotatively receive the article being fed onto the conveyor belt.

6. A conveyor system as in claim 1 wherein the roller-engagement mechanism further includes:
a plurality of stationary parallel second belt support surfaces extending longitudinally and spaced apart laterally the same distance d as the columns of belt rollers and alternately arranged laterally with the first belt support surfaces;
wherein the actuator is coupled to the second belt support surfaces to move the second belt support surfaces between the first position in which the second belt support surfaces are out of contact with the belt rollers and the second position in which the second belt support surfaces are in contact with the belt rollers;
wherein, in the second position, the belt rollers in the roller-engagement zone rotate on the second belt support surfaces as the conveyor belt advances in the first direction to rotate the belt rollers on their axes of rotation.

7. A conveyor system as in claim 6 wherein the belt rollers extend through the thickness of the conveyor belt to contact the first support surfaces under the conveyor belt and to support articles carried on the conveyor belt.

8. A conveyor system as in claim 6 further comprising an infeed conveyor arranged oblique to the first direction to feed articles onto the conveyor belt at the first side in the roller-engagement zone from an oblique angle.

9. A conveyor system as in claim 6 wherein the belt rollers are the lower belt rollers of stacked roller sets that each include an article-supporting upper belt roller rotatively coupled to a lower belt roller, both the upper belt roller and the lower belt roller being rotatable on axes of rotation parallel to each other and oblique to the first direction.

10. A conveyor system as in claim 9 further comprising:
an infeed conveyor arranged to feed articles onto the conveyor belt at the first side in the roller-engagement zone; and
an outfeed conveyor arranged at the second side of the conveyor belt in the roller-engagement zone opposite the infeed conveyor to receive articles transferred past the second side from the conveyor belt.

11. A conveyor system as in claim 9 further comprising:
an infeed conveyor arranged to feed articles onto the conveyor belt at the first side in the roller-engagement zone; and
a sensor sensing that an article is being fed onto the conveyor belt from the infeed conveyor and coupled to the actuator to move the first and second belt support surfaces to the second position to cause the stacked roller sets to rotate and draw the article onto the conveyor belt.

12. A conveyor system as in claim 6 further comprising:
an infeed conveyor arranged to feed articles onto the conveyor belt at the first side in the roller-engagement zone; and
a sensor sensing that an article has been fed onto the conveyor belt from the infeed conveyor,
wherein the sensor is coupled to the actuator to selectively move the first and second belt support surfaces to the first position to inhibit rotation of the stacked roller sets in the roller-engagement zone so that the article advances in the first direction with the conveyor belt or to maintain the first and second belt support surfaces in the second position allowing the stacked roller sets in the roller-engagement zone to rotate and translate the article across the conveyor belt in the second direction to the outfeed conveyor.

13. A conveyor system as in claim 6 wherein the actuator selectively translates the first and second belt support surfaces between the first position and the second position.

14. A conveyor system as in claim 6 comprising elongated rollers rotatable on axes parallel to the first direction and having outer surfaces forming the second belt support surfaces.

15. A conveyor system as in claim 1 comprising belts having outer surfaces forming the first belt support surfaces.

16. A roller-engagement mechanism for a conveyor belt advancing longitudinally in a first direction at a belt speed and having a plurality of belt rollers rotatable on axes of rotation oblique to the first direction and arranged in spaced apart longitudinal columns and lateral rows, the mechanism comprising:
a plurality of parallel first belt support surfaces extending longitudinally and spaced apart laterally the same distance as the longitudinal columns of belt rollers, wherein the first belt support surfaces advance in the first direction at the belt speed;
an actuator coupled to the first belt support surfaces to move the first belt surfaces between a first position in which the first belt support surfaces are in contact with the belt rollers and a second position in which the second belt support surfaces are out of contact with the belt rollers;
wherein, in the first position, the first belt support surfaces advance in the first direction at the belt speed to inhibit the rotation of the belt rollers.

17. A roller-engagement mechanism as in claim 16 further comprising:
a plurality of stationary parallel second belt support surfaces extending longitudinally and spaced apart laterally the same distance as the columns of belt rollers and alternately arranged laterally with the first belt support surfaces;
wherein the actuator is coupled to the second belt support surfaces to move the second belt support surfaces between the first position in which the second belt support surfaces are out of contact with the belt rollers and the second position in which the second belt support surfaces are in contact with the belt rollers;
wherein, in the second position, the belt rollers in the roller-engagement zone rotate on the second belt support surfaces as the conveyor belt advances in the first direction to rotate the belt rollers on their axes of rotation.

18. A roller-engagement mechanism as in claim 17 comprising elongated rollers rotatable on axes parallel to the first direction and having outer surfaces forming the second belt support surfaces.

19. A roller-engagement mechanism as in claim 17 wherein the actuator selectively translates the first and second belt support surfaces between the first position and the second position.

20. A roller-engagement mechanism as in claim 16 comprising belts having outer surfaces forming the first belt support surfaces.

21. A roller-engagement mechanism as in claim 16 wherein the actuator is a linear actuator.

22. A method for conveying, comprising:
    advancing a conveyor belt in a first direction at a belt speed, wherein the conveyor belt has a plurality of article-supporting belt rollers arranged to rotate on axes oblique to the first direction;
    feeding articles onto the conveyor belt and atop the belt rollers in a second direction transverse to the first direction at an infeed position on a first side of the conveyor belt;
    selectively inhibiting the rotation of the belt rollers to cause articles fed onto the conveyor belt to advance with the conveyor belt in the first direction at the belt speed and enabling the belt rollers to rotate to rotatively receive articles fed onto the conveyor belt at the infeed position.

23. The method of claim 22 further comprising sensing the feeding of an article onto the conveyor belt and responding thereto by enabling the belt rollers to rotate to receive the article onto the conveyor belt.

24. The method of claim 23 further comprising sensing the reception of a complete article onto the conveyor belt and responding thereto by either:
    continuing to enable the belt rollers to rotate to rotatively allow the article fed onto the conveyor belt to move across the conveyor belt; or
    inhibiting the rotation of the belt rollers to cause articles fed onto the conveyor belt to advance the article with the conveyor belt in the first direction.

25. The method of claim 22 wherein enabling the belt rollers to rotate comprises allowing the belt rollers to rotate freely on their oblique axes of rotation.

26. The method of claim 22 wherein enabling the belt rollers to rotate comprises actuating the belt rollers to rotate obliquely forward on their oblique axes of rotation.

27. The method of claim 22 wherein enabling the belt rollers to rotate comprises actuating the belt rollers to rotate obliquely rearward on their oblique axes of rotation.

* * * * *